United States Patent
Yamanaka

(10) Patent No.: US 7,410,163 B2
(45) Date of Patent: Aug. 12, 2008

(54) SHEET CONVEYING APPARATUS AND IMAGE READING APPARATUS

(75) Inventor: Yuji Yamanaka, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 11/029,571

(22) Filed: Jan. 6, 2005

(65) Prior Publication Data

US 2005/0157357 A1   Jul. 21, 2005

(30) Foreign Application Priority Data

Jan. 15, 2004   (JP)   ............... 2004-008332

(51) Int. Cl.
*B65H 29/00* (2006.01)
(52) U.S. Cl. .......... 271/186; 271/65; 271/301; 271/291
(58) Field of Classification Search ........ 271/186, 271/301, 65, 291
See application file for complete search history.

(56) References Cited

U.S. PATENT DOCUMENTS

| 5,300,998 | A | 4/1994 | Ogisawa et al. ......... 355/285 |
| 5,365,321 | A | 11/1994 | Koshimizu et al. ...... 355/285 |
| 6,354,589 | B1 | 3/2002 | Taruki et al. .......... 271/265.01 |
| 6,671,491 | B1 | 12/2003 | Yamanaka et al. ........ 399/407 |
| 6,674,991 | B2 | 1/2004 | Makino et al. ........... 399/374 |
| 2002/0025203 | A1 | 2/2002 | Makino et al. ........... 299/367 |
| 2003/0117673 | A1 | 6/2003 | Yamanaka ............... 358/498 |
| 2004/0140606 | A1* | 7/2004 | Kobayashi et al. ....... 271/4.01 |
| 2005/0128536 | A1 | 6/2005 | Yamanaka et al. ........ 358/488 |
| 2005/0157357 | A1 | 7/2005 | Yamanaka ............... 358/498 |

FOREIGN PATENT DOCUMENTS

| JP | 11-193159 | 7/1999 |
| JP | 2000-143104 | 5/2000 |
| JP | 2002-137839 | 5/2002 |
| JP | 2002-220149 | 8/2002 |
| JP | 2003-095542 | 4/2003 |

* cited by examiner

*Primary Examiner*—Kaitlin S Joerger
(74) *Attorney, Agent, or Firm*—Fitzpatrick, Cella, Harper & Scinto

(57) ABSTRACT

A sheet conveying apparatus includes: a first path through which a sheet passes; a switchback member that switches back the sheet passing through the first path and conveys the sheet; a second path through which the sheet switched back and conveyed by the switchback member passes; a guide member that can swing; and a limit member that limits the swing of the guide member. The guide member guides the sheet passing through the first path on one side of the guide member and guides the sheet passing through the second path on the other side of the guide member. A preceding sheet passing through the second path and a following sheet passing through the first path are conveyed in such a way that they pass each other and when the guide member is swung to the second path side, the swing of the guide member is limited by the limit member, whereby a predetermined path interval is secured in the second path.

12 Claims, 13 Drawing Sheets

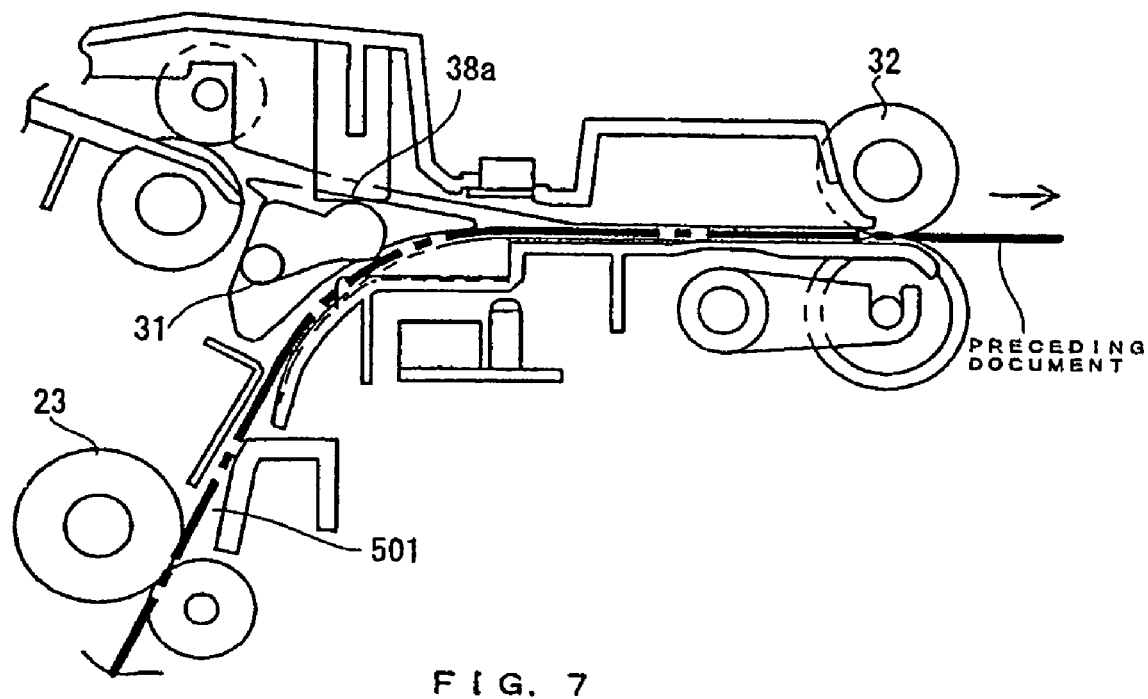
F I G. 7

SHEET CONVEYING APPARATUS AND IMAGE READING APPARATUS

BACKGROUND OF THE INVENTION

1. Field of the Invention

The present invention relates to a sheet conveying apparatus for conveying sheets and an image reading apparatus that is provided with the sheet conveying apparatus and reads images on the sheets conveyed by the apparatus.

2. Description of the Related Art

Conventional image reading apparatuses provided in digital copying machines, printers, and facsimiles include an image reading apparatus in which an Auto Document Feeder (ADF), which is one example of the sheet conveying apparatuses, is provided in such a way as to be freely opened or closed with respect to a platen glass and a original base glass in order to feed a document, which is one example of the sheets, automatically to the image reading apparatus.

Among the reading methods of the image reading apparatus provided with this ADF is the following reading method (hereinafter referred to as "flow reading"): reading means provided below the ADF is moved to a set position with respect to a document automatically fed by the ADF by a motor and is stopped there; then, light is emitted from a lamp unit to the document conveyed at a predetermined speed to scan the document; and then its reflected light is detected by reading means to read the image.

Further, in the case of a two-sided document is adopted the following three-circulation two-side reading method: a document is fed to a reading part where an obverse image is read by flow reading; then, the document is switched back by a sheet discharging part and is fed again to the reading part where a reverse image is read; and then, the document is again switched back by the sheet discharging part and then is again circulated to the reading part to change the direction of the document and then is discharged.

In order to improve productivity in reading the two-sided document, there is provided a high-speed two-side reading method for conveying a following two-sided document by utilizing time that elapses while a preceding two-sided document is switched back, that is, a conveyance path space. The method is disclosed, for example, in Japanese Patent Application Laid-Open No. 2000-143104. To be more specific, according to this method, an image on the reverse side of the Nth document is read and then the (N+1)th document is fed to the reading part where an image on the obverse side of the (N+1)th document is read; and then, the (N+1)th document is switched back while the Nth document of the third circulation is passed through the reading part.

However, in the case of performing the high-speed two-side reading, a path length needs to be elongated so as to prevent two documents from colliding with each other to elongate the time required to pass the path, which does not very much improve productivity. Further, the elongated path length presents a problem of increasing the size of the apparatus.

Further, if the construction shown in FIG. 12 is adopted to convey sheets in such a way that a preceding sheet and a following sheet pass each other when the preceding document is switched back, the path length can be shortened and an apparatus can be prevented from being increased in size, but the following defects remain.

In the state shown in FIG. 12, an image on the reverse side of the Nth document is read and the Nth document is switched back by a sheet discharging and reversing part X and is being conveyed to the second registration rollers 27', 28'.

Further, the next (N+1)th document is being conveyed to the sheet discharging and reversing part X while an image on the obverse side is being read. At this time, the (N+1)th document travels while lifting a flapper 31' by its front end.

Here, the Nth document passing the top surface side of the flapper 31' is sandwiched between an upper guide and the flapper 31' to become wavy at the sheet discharging and reversing part X to impair the entry of the (N+1)th document.

To prevent the document from becoming wavy, it is required to elongate an interval between the Nth document and the (N+1)th document in such a way that after the front end of the Nth document enters the second registration rollers 27', 28' and the sheet discharging and reversing roller is separated from the Nth document, the (N+1)th document enters the flapper 31'. However, this presents a problem of elongating a conveyance-path and increasing the size of an apparatus.

Further, if the Nth document and the (N+1)th document are conveyed in such a way that they pass each other, the Nth document and the (N+1)th document are put into sliding contact with each other. The sliding contact between the Nth document and the (N+1)th document applies load to the conveyance of the Nth document. Hence, to the Nth document are applied the load caused by the sliding contact with the (N+1)th document and the load caused by the pressure of the flapper 31'. There is a possibility that the load applied to the Nth document will impair also the conveyance of the Nth document.

In order to avoid the swing of the flapper from applying load to the document, a construction for preventing the flapper from swinging is disclosed in Japanese Patent Application Laid-Open No. 2003-95542. In the construction shown in FIG. 13, which is disclosed in Japanese Patent Application Laid-Open No. 2003-95542, switching members 460, 470 that construct a flapper is applied a force in the counterclockwise direction by a spring 471. A document is conveyed to the left side in the drawing by a conveyer roller 431 and the top surface of the document is guided by the bottom surface of the flapper 460.

When the document is guided and conveyed by the switching members 460, 470, the switching member 470 that is integral with the switching member 460 is swung by the force applied by the front end of the document. The swinging of the switching member 470 is limited by the lower protrusion 470a2 of a stopper 470a abutting against the lower wall surface 430b of a frame. The pressing force that the front end of the document applies to the switching member 460 opens a path on the downstream side of the swinging pivot 453 of the switching members 460, 470 and closes a path on the upstream side of the swinging pivot 453 to a position where a path to the downstream side is secured. That is, the construction disclosed in Japanese Patent Application Laid-Open No. 2003-95542 solves a problem that when the document moves the switching member, the conveyance of the document is impaired by the flapper.

However, as described by use of FIG. 12, there still remains the following problem: in the construction where Nth document and the (N+1)th document pass each other, the (N+1)th document swings the flapper; and the swung flapper impairs the conveyance of the Nth document.

In other words, the Nth document is pinched by the swung flapper 31' to become wavy and the wavy Nth document prevents the entry of the (N+1)th document. Further, there are cases where the load caused by the Nth document being pressed by the flapper 31' and the load caused by the sliding contact with the (N+1)th document are applied to the Nth document and this load applied to the Nth document is likely to impair the conveyance of the Nth document.

SUMMARY OF THE INVENTION

The present invention has been made to solve the above problems. The object of the present invention is to provide a sheet conveying apparatus and an image reading apparatus in which two sheets are conveyed by two conveyer paths between which a flapper is interposed in such a way that they pass each other to stabilize sheet conveyance.

In order to solve the above problems, a sheet conveying apparatus of the present invention includes: a first path through which a sheet passes; a switchback member that switches back the sheet passing through the first path and conveys the sheet; a second path through which the sheet switched back and conveyed by the switchback member; a guide member that can swing, wherein the guide member guides the sheet passing through the first path on one side of the guide member and guides the sheet passing through the second path on the other side of the guide member; and a limit member that limits the swing of the guide member, and a preceding sheet passing through the second path and a following sheet passing through the first path are conveyed in such a way that they pass each other, and when the guide member is swung to the second path side, the swing of the guide member is limited by the limit member, whereby a predetermined path interval is secured in the second path.

Further, a sheet conveying apparatus of the invention includes: a switchback roller; a first path that introduces a sheet to the switchback roller; a second path that receives the sheet conveyed by the switchback roller in a direction opposite to a direction in which the sheet is introduced from the first path; a guide member that is provided between the first path and the second path and can swing; and a limit member that limits the swing of the guide member, and when the guide member is swung to the second path side, the swing of the guide member is limited by the limit member, whereby a path interval is secured in the second path.

BRIEF DESCRIPTION OF THE DRAWINGS

FIG. 7 is an illustration to show a state of conveyance where sheets pass each other in accordance with embodiment.

DESCRIPTION OF THE PREFERRED EMBODIMENT

An image reading apparatus in accordance with embodiment of the present invention and a copying machine which is an image forming apparatus having this image reading apparatus in a main unit will be described on the basis of the drawings.

[Description of Apparatus]

Figure 1:
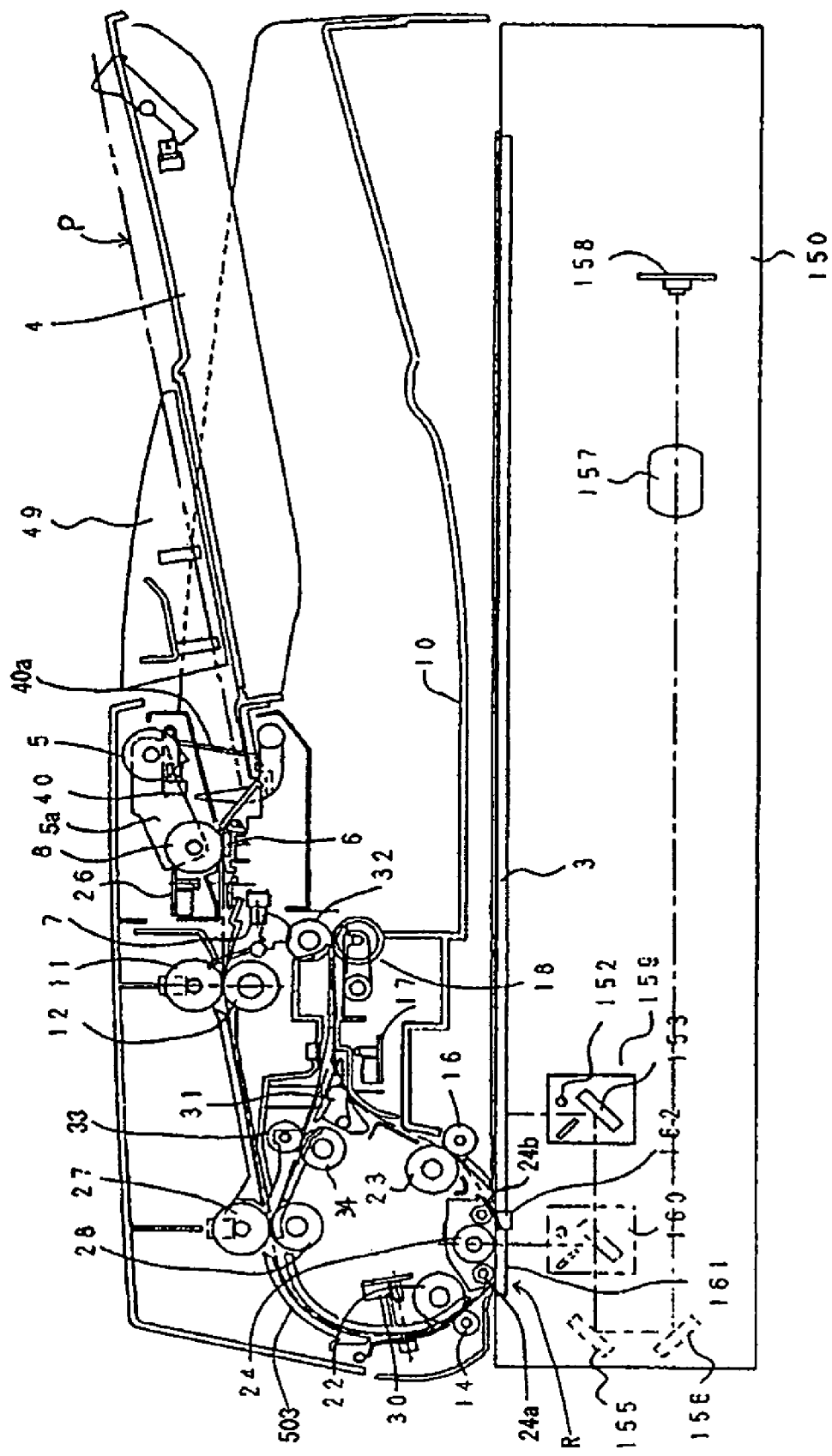
FIG. 1 is a sectional view to show the construction of an image reading apparatus and an Auto Document Feeder in accordance with embodiment.
Figure 2:
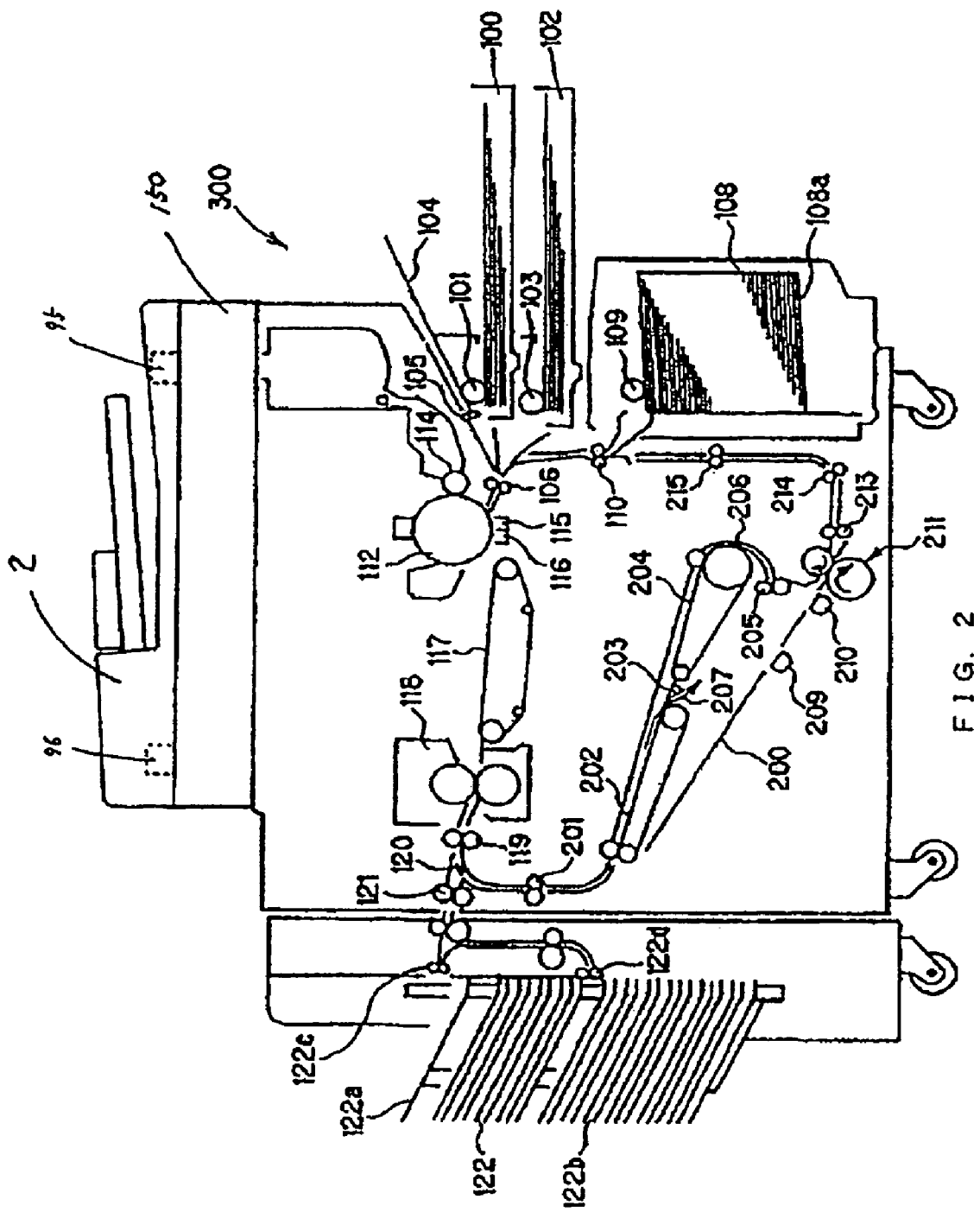
FIG. 2 is a sectional construction view to show the construction of an image forming apparatus in accordance with embodiment.

In FIG. 1 and FIG. 2, a reference numeral 150 denotes a reader unit, 2 denotes an Auto Document Feeder (ADF) as a sheet conveying apparatus, and 300 denotes a printer unit.

[Description of Reader Unit]

The reader unit 150 includes a lamp 152 that emits light to the surface of a document and mirrors 153, 155, 156 that guide light corresponding to the light emitted by the lamp 152 and reflected by a document P as a sheet document, which is one example of sheets, to a lens 157 and a CCD 158. The lamp 152 and the mirror 153 are fixed to the first optical base 159 and the mirrors 155, 156 are fixed to the second optical base (not shown).

Further, the first optical base 159 and the second optical base are connected to a motor 314 (see FIG. 5) by a wire (not shown) and are so controlled as to move in parallel to the plane of a document base glass 3 by the rotation of the motor 314.

A position sensor 315 (see FIG. 3) is a sensor for detecting the home position of the first optical base 159 and the first optical base 159 and the second optical base are moved by rotating the motor 314 forward or backward with reference to the position of the position sensor 315 to scan the document P on the document base glass 3 optically.

Further, the motor 314 is constructed of a stepping motor. An encoder 302 (see FIG. 3) is connected to this motor 314 and it can be recognized by the output (pulse) of this encoder how many pulses the first optical base 159 and the second optical base are moved. That is, the positions of the first optical base 159 and the second optical base can be found by the position sensor 315 and the encoder pulses from the encoder 302.

The light emitted by the lamp 152 and reflected by the document P is guided via the mirrors 153, 155, 156 to the lens 157 and is collected on the CCD 158 by the lens 157. The CCD 158 converts the reflected light reflecting document information to electricity to output an electronic image signal.

In this construction, the document information can be read in two modes of: a flow read mode in which the document information is read while the document P is being conveyed by an ADF 2 in a state where the first optical base 159 is stopped at a document read position 160; and a document base glass read mode in which the document information is read while the first optical base 159 and the second optical base are being moved in a sub-scanning direction with the document P fixedly placed on the document base glass 3.

Figure 3:
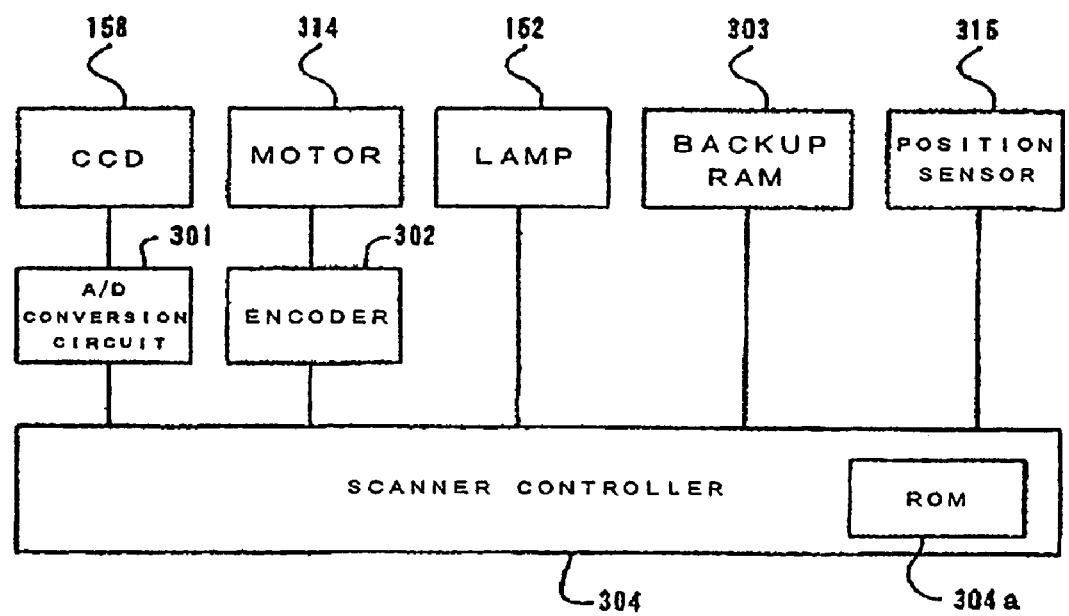
FIG. 3 is a control block diagram of an image reading apparatus in accordance with embodiment.

FIG. 3 is a block diagram to show the general construction of control system of a reader. The control system of a reader includes the lamp 152 for emitting light to the surface of the document, the motor 314 for moving the first optical base 159 and the second optical base in a sub-scanning direction to scan the document, the CCD 158 for converting the light reflected by the document to electricity, an A/D conversion circuit 301 for A/D converting the output signal from the CCD 158, the encoder 302 connected to the motor 314, the lamp 152 for emitting light to document P, the position sensor 315 for positioning the first optical base 159 at the home position, a backup RAM 303 for setting a regular document read position in the flow read mode by the ADF 2, and a scanner controller 304. The scanner controller 304 is mounted with a ROM 304a.

[Description of Printer Unit]

A printer unit 300 is image forming means using a well-known electrostatic latent image forming method. The printer unit 300 of an image output unit will be described by use of FIG. 2.

A reference numeral 100 denotes an upper cassette and the sheets of paper (recording paper) in the upper cassette are separated and fed one by one by the action of a separation claw and a feed roller 101 to be guided to registration rollers 106. 102 denotes a lower cassette and the sheets of paper in the lower cassette 102 are separated and fed one by one by the action of a separating claw and a feed roller 103 to be guided to the registration rollers 106. 104 denotes a manual feed guide and the sheets of paper are guided one by one from the manual feed guide 104 via rollers 105 to the registration rollers 106.

A reference numeral 108 denotes a sheet stacking part (deck type) and the sheet stacking part 108 has a middle plate 108a moved up and down by a motor or the like and the sheets of paper on the middle plate 108a are separated and fed one by one by the action of a feed roller 109 and a separation claw to be guided to recording sheet conveying rollers 110.

A photosensitive drum 112, a development unit 114, a transfer charger 115, and a separation charger 116 form image forming means and construct an image forming unit for forming an image on the sheet guided to the registration rollers 106.

A reference numeral 117 denotes a conveyer belt for conveying the sheet having an image formed thereon, 118 denotes a fixing unit for fixing an image on the sheet conveyed by the conveyer belt 117, 119 denotes recording paper conveying rollers for conveying sheet discharged from the fixing unit 118, and 120 denotes a diverter for guiding sheet conveyed by the recording paper conveying rollers 119.

The sheet having an image formed thereon is guided to discharge rollers 121 by the diverter 120 and is conveyed into a sorter 122. The sorter 122 includes a non-sort tray 122a, a sort-bin tray 122b, non-sort tray discharge rollers 122c, and sort-bin tray discharge rollers 112d. The non-sort tray 122a and the sort-bin tray 112b are moved up and down to sort the sheets step by step. There are cases where a discharge tray is provided in place of the sorter.

In the case of two-side copy and multiple copy, the sheet after fixing is branched by the diverter 120 and is conveyed by the conveyer rollers 201. Then, in the case of two-side copy, the sheet is conveyed via belts 202, 204, a path 206, and discharge rollers 205, and is swung upside down and discharged to an intermediate tray 200, and in the case of multiple copy, the sheet is discharged to the intermediate tray 200 by the diverter 203 without being swung upside down. Reference numerals 209, 210 denote half-moon rollers for feeding sheet, 211 denotes a separation roller pair, 213, 214, 215 denote rollers for conveying the sheet to the registration rollers 106.

[Description of Auto Document Feeder (ADF)]

The ADF 2 is provided above the reader unit 150 via hinge mechanisms 95, 96 in such a way as to be opened or closed with respect to a platen glass 161 and the document base glass 3. Hereafter, the details of the ADF 2 will be described on the basis of the drawings.

[Description of Document Tray Part]

In FIG. 1, a document tray 4 is such that used for stacking sheet-shaped documents P. A pair of width direction limiting plates are arranged in such a way as to be freely slide in the direction of width of the document in the document tray 4. It is possible to secure stability in conveying the documents by limiting the direction of width of the documents P stacked on the document tray 4.

[Description of Separation Part]

A feed roller 5 as a feed member is provided above the document tray 4. The feed roller 5 is rotated along with the rotation of a separation conveyer roller 8 to feed the document P.

The feed roller 5 is usually located at the home position (shown by solid line in the drawing) with pulled back upward not to hamper a work of setting the document. When an operation of feeding the sheets is started, the feed roller 5 is moved down to abut against the top surface of the document P. Since the shaft of the feed roller 5 is rotatably supported by an arm 5a, the feed roller 5 can be moved up and down by swinging the arm 5a.

A separation pad 6 is arranged on a side opposite to the separation conveyer roller 8 and applies pressure to the separation conveyor roller 8. The separation pad 6 is formed of rubber material having friction slightly smaller than the separation conveyer roller 8 and separates the documents P fed by the feed roller 5 one by one and the documents are conveyed by the separation conveyor roller 8.

Description of Conveyer Part

A registration roller 12 and a registration driven roller 11 are registration means for registering the front ends of the documents P fed by the separation part and make the front end of the separated document P abut against a nip defined by the registration roller 12 and the registration driven roller 11 that are stationary to form a loop of the document P to correct the inclination of the document P, thereby registering the front end of the document P.

The second registration roller 28 and the second registration driven roller 27 correct the inclination of the document P that is switched back by a reversing part when an image on a reverse surface of two surfaces is read, thereby registering the front end of the document P.

Next, the document P is conveyed toward a platen glass 161 by a read roller 22 and a read driven roller 14. The document P conveyed to the platen glass 161 is scooped up by a jumping base 162 and is conveyed by a read discharge roller 23 and a read discharge driven roller 16. The third path 503 from the feed roller 5 to a reading part for reading the image on the document P is the third conveyer path of the present invention.

A reference numeral 24 denotes a platen roller and the platen roller 24 is arranged with a gap of 0.3 mm to the platen glass 161. The platen roller 24 presses the document P together with the sheet pressing rollers 24a, 24b provided adjacently to the platen roller 24 so as to prevent the document P from floating from the platen glass 161.

A reference numeral 31 is a flapper (driven flapper) that can freely swing and the flapper 31 is applied a force clockwise to be usually located at a position shown in FIG. 1.

A reference numeral 32 denotes a sheet discharging and reversing roller which is one example of switch-back member and 18 denotes a sheet discharging and reversing roller as a roller member. The sheet discharging and reversing roller 32 can be rotated forward and backward and has a function of discharging the document P to a sheet discharge tray 10 and a function of switching back the document P. The sheet discharging and reversing roller 18 can be brought into contact with or separated from the sheet discharging and reversing roller 32 by a separation solenoid 57. The reversing part of the present invention is constructed of the sheet discharging and reversing roller 32 and the sheet discharging and reversing roller 18.

A reference numeral 34 denotes an intermediate roller which is one example of the second conveyer roller and 33 denotes an intermediate roller. The intermediate rollers 34, 33 have a function of conveying the document P switched back and conveyed by the sheet discharging and reversing roller 32 to the second registration roller 28. Since the intermediate roller 34 is driven via a one-way clutch by a sheet discharging motor 52, it can convey the document P to the second registration roller 28 and after the document P is pinched by the second registration roller, even if the sheet discharging motor 52 is stopped, the intermediate roller 34 can be rotated with the document P.

[Description of Drive System]

Figure 5:
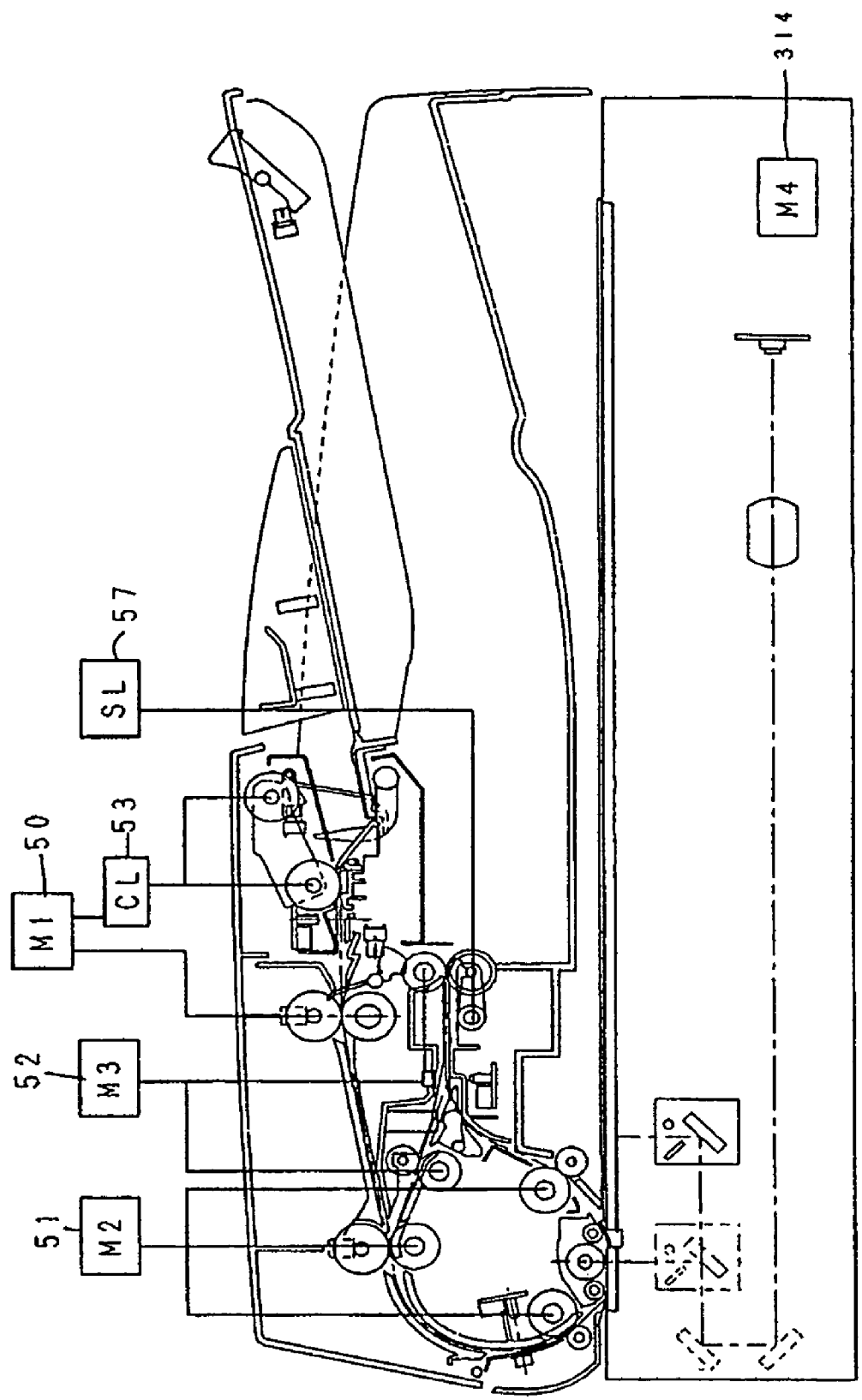
FIG. 5 is an illustration to show the drive system of an Auto Document Feeder in accordance with embodiment.

A drive system for driving the respective rollers will be described by use of FIG. 5.

A separation motor 50 is a stepping motor and rotates forward and backward to separate and convey the document P. When the separation motor 50 rotates in the direction in which the sheet is fed and a clutch 53 is turned ON (brought into a coupling state), the feed roller 5 is moved down from the upper position of the home position to be pressed on the uppermost document P on the document tray 4 and the feed roller 5 and the separation roller 8 are driven.

At this time, the registration roller 12 has driving force transmitted thereto via the one-way clutch and hence the registration roller 12 stops.

When the separation motor 50 rotates in the direction of conveyance which is opposite to a direction in which the sheet is fed and the clutch 53 is turned off (brought into a non-coupling state), the registration roller 12 rotates.

A read motor 51 is a stepping motor for driving the second registration roller 28, the read roller 22, the platen roller 24, the read discharge roller 23, and the sheet discharging and reversing roller 18. The read motor 51 drives the respective rollers at a speed at which the image on the conveyed document P is read.

The separation solenoid 57 presses or separates the sheet discharging and reversing roller 18 onto or from the document P when a two-sided document is switched back.

The sheet discharging motor 52 is a stepping motor for driving the sheet discharging and reversing roller 32 and the intermediate roller 34 via the one-way clutch. The sheet discharging motor 52 can be rotated forward and backward and discharges the document P from the ADF 2 when it is rotated forward. Further, the sheet discharging motor 52 is rotated forward, stopped, and then rotated backward to switch back the document P and conveys the document P to the second registration roller 28.

[Description of Sensor]

The respective sensors will be described by use of FIG. 4. The document tray 4 is provided with a document setting sensor 40 which is a transparent optical sensor for detecting that the document P is set.

Further, a tray width sensor 44 for detecting the length in the direction of width of a stack of documents set on the document tray 4 by detecting the position of the width direction limit plate is provided under the document tray 4.

A post-separation sensor 26 is constructed of a light emitting device, a light receiving device, and a reflection plate, and detects double feed and faulty feed.

A registration sensor 7 of a transparent optical sensor for detecting the document is provided between the separation roller 8 and the registration roller 12 and detects the front end of the document that is separated and fed and detects the timing at which the amount of abutment (the amount of loop) when the document abuts against the registration roller 12 is controlled.

The read sensor 13 is constructed of a light emitting device, a light receiving device, and a reflection plate and is arranged just before the read roller 22 and is used for a reference signal of the timing when the reading part starts to read the image.

The sheet discharge sensor 17 is constructed of a light emitting device, a light receiving device, and a reflection plate and is arranged just before the sheet discharging and reversing roller 18 and detects the timing when the document is discharged and the timing when the document is switched back.

[Description of Sheet Feed Operation]

One-sided mode: when copying conditions are inputted by the operation part of a copying machine and a start key is pressed, the feed roller 5 is moved down to feed the document P.

Then, the document P is separated and fed by the separation roller 8 and the separation pad 6.

Next, the document P abuts against the nip defined by the registration roller 12 and the registration driven roller 11 that are stationary to form a loop, thereby being stopped.

Next, the registration roller 12 is rotated, whereby the document P is fed to the second registration roller 28 and is passed through the read roller 22 and is supplied to the reading part R.

At the reading part R, the platen roller 24 and the sheet pressing rollers 24a, 24b prevent the document P from floating from the platen glass 161, whereby the image can be read excellently to improve image quality.

Next, the document P is passed through the read discharge roller 23, the flapper 31, and the sheet discharging and reversing roller 32 and is discharged face down to the sheet discharge tray 10.

Further, when the rear end of the Nth document P comes out of the post-separation sensor 26, the feeding of the (N+1)th document P is started to improve productivity.

Two-sided mode: after the image on the obverse surface of the document P is read, the document P is switched back by the sheet discharging and reversing roller 32 and is passed over the top surface of the flapper 31 and is conveyed by the intermediate rollers 33 and is made to abut against the nip defined by the second registration roller 28 and the second registration driven roller 27 that are stationary to form a loop to correct the inclination of the document P.

Next, the second registration roller 28 is rotated and the document P is supplied to the reading part by the read roller 22.

After the image on the reverse side is read, the document P is again switched back by the sheet discharging and reversing roller 32 so as to put the direction of the document in order and then is supplied again to the reading part R, but at this time, the loop is not formed and the image is not read. Then, the document P is discharged face down to the sheet discharge tray 10.

[Description of Switchback Mechanism]

Figure 6:
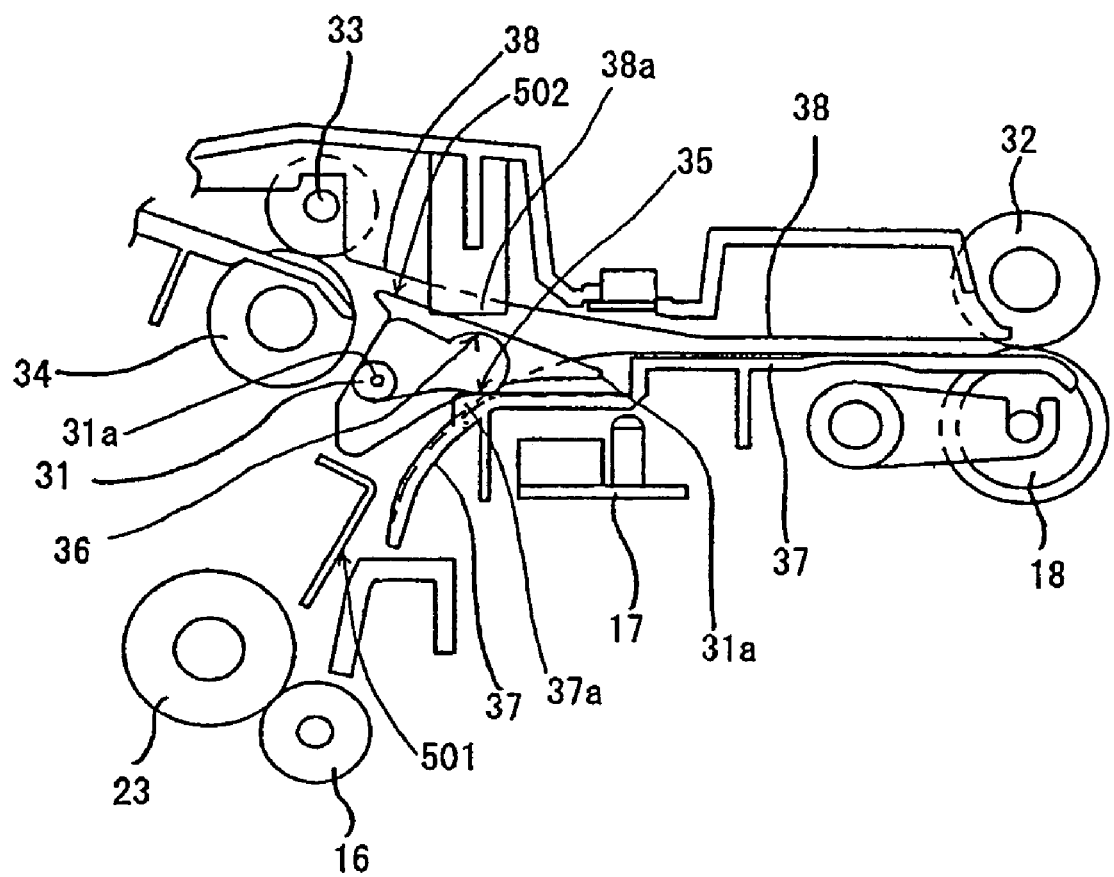
FIG. 6 is an illustration to show the construction of a flapper part in accordance with embodiment.

A construction for switching back the document in two-sided mode will be described. In FIG. 6, the flapper 31 as the guide member of the present invention is interposed between the first path 501 from the read discharge roller 23 as the first conveyor roller to the sheet discharging and reversing roller 32 and the second path 502 from the sheet discharging and reversing roller 32 to the intermediate roller 34 as the second conveyor roller and is supported in such a way as to swing freely. That is, the flapper 31 is provided at a position where first path through which the document conveyed to the sheet discharging and reversing roller 32 is passed merges with the second path through which the document switched back by the sheet discharging and reversing roller 32 and conveyed by the sheet discharging and reversing roller 32 is passed.

The flapper 31 plays a role as the upper guide of the first path 501 and a role as the lower guide of the second path 502. In other words, the document passing through the first path 501 is guided by the bottom surface of the flapper 31. Further, the document that is switched back by the sheet discharging and reversing roller 32 and is conveyed by the sheet discharging and reversing roller 32 in such a way as to pass the second path 502 is guided by the top surface of the flapper 31.

The flapper 31 is formed in the shape of a comb and the tip 31a of the flapper 31 are fitted between the ribs (depressed portions) of a sheet discharge lower guide 37 to prevent the document P from lodging in the flapper 31 when the document P is switched back.

The flapper 31 is provided at both outside ends in the direction of width of the document with swing limit parts 35, 36 and is applied a force in the clockwise direction by an urging spring 31a of urging means in normal times (at standby times during which the document is not conveyed). The flapper 31 abuts against the second abutting part 37a that is one example of the second limit member of the sheet discharge lower guide 37. In this state, in both of the first path 501 and the second path 502, the document P can enter the flapper 31.

When the flapper 31 is going to swing in the counterclockwise direction, the swing limit part 36 of the flapper 31 abuts against the first abutting part 38a that is one example of the limit member of a sheet discharge upper guide 38 to limit the swing of the flapper 31. The first abutting part 38a and the second abutting part 37a are provided outside the document passage area in which the document is passed.

In a state where the swing limit part 35 of the flapper 31 abuts against the first abutting part 38a, the front end of the document is hard to enter the flapper 31 in the second path 502. However, in this state, a path interval is secured in both of the first path 501 and the second path 502, so it is guaranteed that the document P can pass. Hence, both of the first path 501 and the second path 502 can pass the document smoothly.

[Description of High-Speed Two-Side Read]

Next, an operation of high-speed two-side read will be described by use of FIG. 7 to FIG. 10.

FIG. 7 shows a state where an image on the reverse side of a preceding document is read and where the front end of the preceding document is conveyed to the sheet discharging and reversing roller 32. At this time, a following document is already fed and follows the preceding document at a predetermined interval from the rear end of the preceding document (not shown). In this manner, the sheet discharging and reversing roller 32 has the document introduced thereto from the first path 501. When the document is introduced from the first path 501, the sheet discharging and reversing roller 32 is rotated forward. The flapper 31 is swung to the first abutting part 38a (in the counterclockwise direction) against the urging force of the urging means by the stiffness of the document conveyed by the read discharge roller 23 that is a roller located on the upstream side of the flapper 31 in the first path 501.

Figure 8:
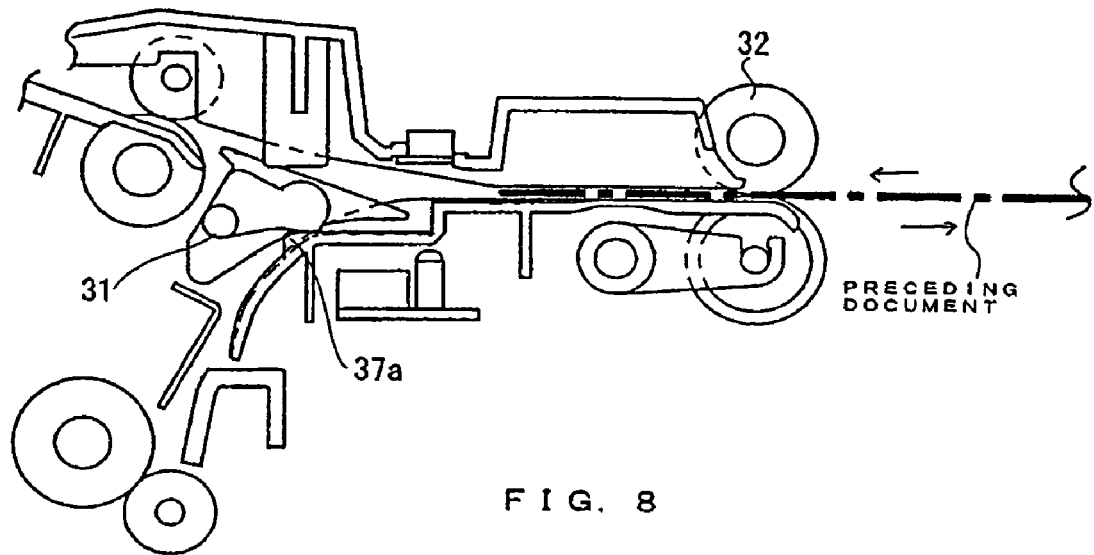
FIG. 8 is an illustration to show a state of conveyance where sheets pass each other in accordance with embodiment.

The sheet discharging and reversing roller 32 has the document introduced thereto from the first path 501 and then is rotated in the direction opposite to the direction when the document is introduced to convey the document to the second path 502. FIG. 8 shows a state where the preceding document is stopped by the sheet discharging and reversing roller 32 and is switched back by the reverse rotation of the sheet discharging and reversing roller 32. At this time, the flapper 31 is in a state where it abuts against the second abutting part 37a of the sheet discharge lower guide 37.

Figure 9:
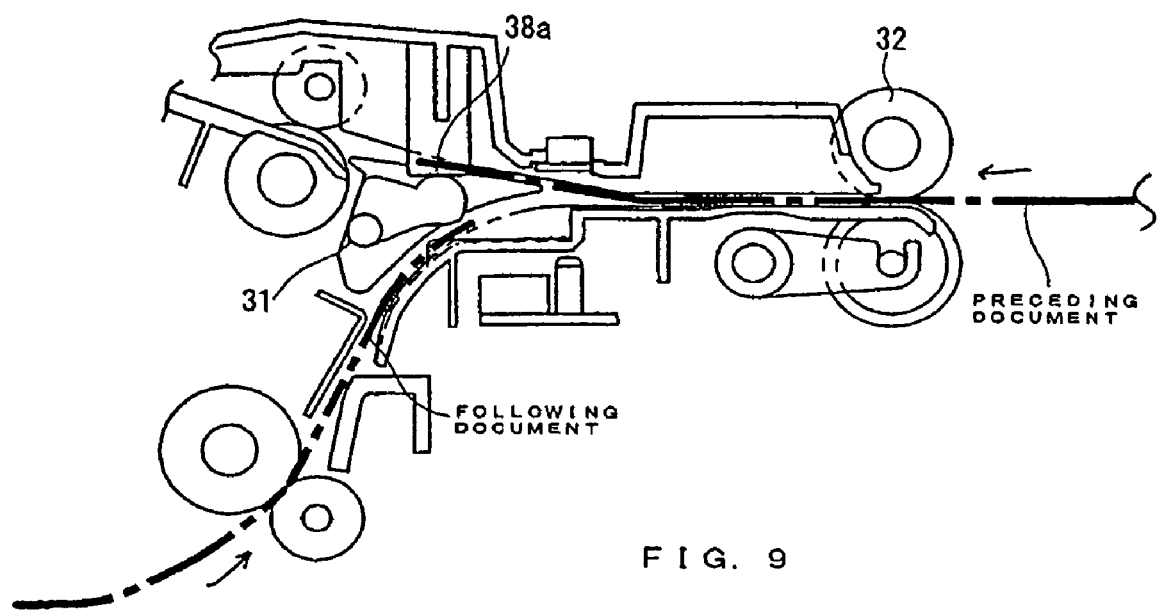
FIG. 9 is an illustration to show a state of conveyance where sheets pass each other in accordance with embodiment.

FIG. 9 shows a state where when the preceding document is guided by the top surface of the flapper 31 so as to pass the second path 502, the front end of the following document (the obverse side of which is being read) is guided by the bottom surface of the flapper 31. The following document is being conveyed to the sheet discharging and reversing roller 32 while pushing up the bottom surface of the flapper 31. At this time, the following document pushes up and swings the flapper 31 against the urging force of the urging spring 31a. The flapper 31 swung by the following document abuts against the first abutting part 38a of the sheet discharging upper guide 38, thereby being prevented from swinging.

Thereafter, the following document is conveyed further by the read discharge roller 23. The preceding document conveyed by the sheet discharging and reversing roller 32 and the following document pass each other in a region between the flapper 31 and the sheet discharging and reversing roller 32.

The swinging of the flapper 31 to the second path 502, which is caused by the following document, is limited by the first abutting part 38a. Hence, even if the flapper 31 is swung to the second path 502, a predetermined path interval is secured for the second path 502. Since the predetermined path interval is secured for the second path 502, the preceding document can be conveyed smoothly. Since the preceding document is conveyed smoothly, for example, there is not a case where the preceding document is sandwiched by the flapper 31 and the sheet discharge upper guide 38 to become wavy, the following document conveyed in such a way that the following document and the preceding document pass each other is also conveyed smoothly to the sheet discharging and reversing roller 32.

Also when the preceding document and the following document are conveyed in such a way that they pass each other, the image on the obverse surface of the following document is read by the reading part. Since the following document is conveyed smoothly as described above, the image can be read excellently.

When the preceding document reaches the intermediate roller 34, the sheet discharging and reversing roller 18 is separated from the sheet discharging and reversing roller 32. The preceding document is conveyed by the intermediate roller 34 to make its front end abut against the second registration roller 28 that is stationary, whereby the inclination of the preceding document is corrected. Then, when the second registration roller is rotated to start conveying the document, the sheet discharging and reversing roller 32 has its rotation changed into the direction in which the sheet is discharged to be brought into a state where it can receive the front end of the following document. At this time, the intermediate roller 34 is driven via the one-way clutch, so that when the preceding document is withdrawn by the second registration roller 28, depending on the preceding document, the intermediate roller 34 is rotated with the preceding document.

Figure 10:
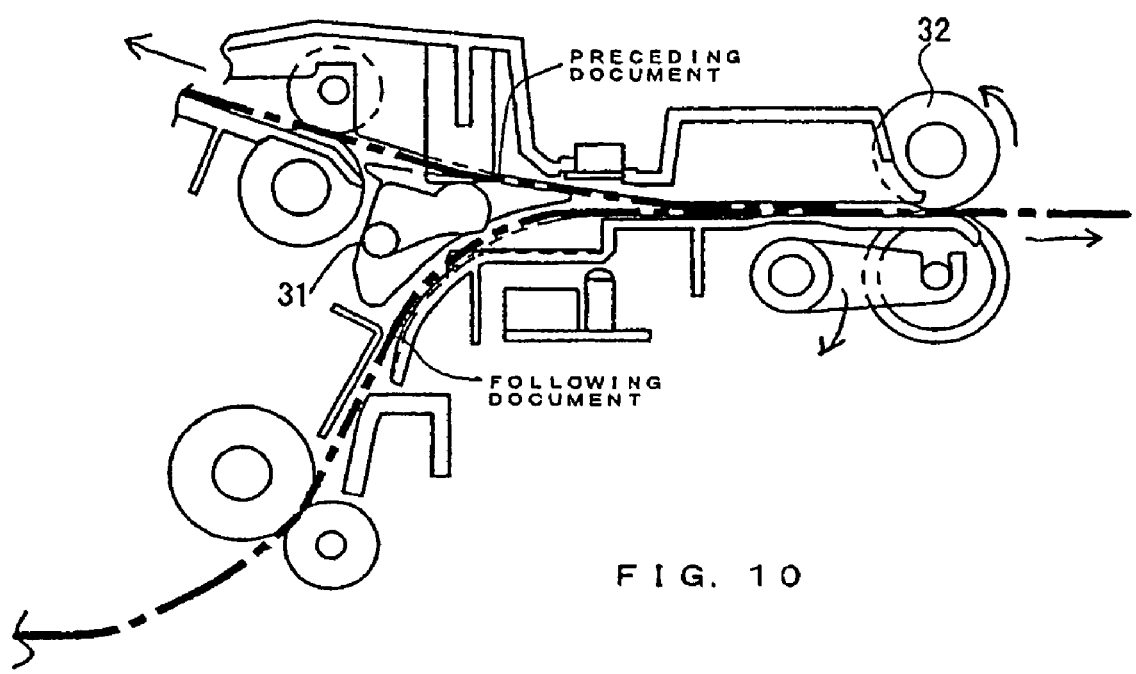
FIG. 10 is an illustration to show a state of conveyance where sheets pass each other in accordance with embodiment.

Then, as shown in FIG. 10, the preceding document and the following document are conveyed in such a way that they pass each other between the flapper 31 and the sheet discharging and reversing roller 32. In this embodiment, even before the preceding document enters the intermediate roller 34, the preceding document and the following document pass each other.

[On the Arrangement Position of Intermediate Roller and the Condition of Sheet Interval]

Figure 11:
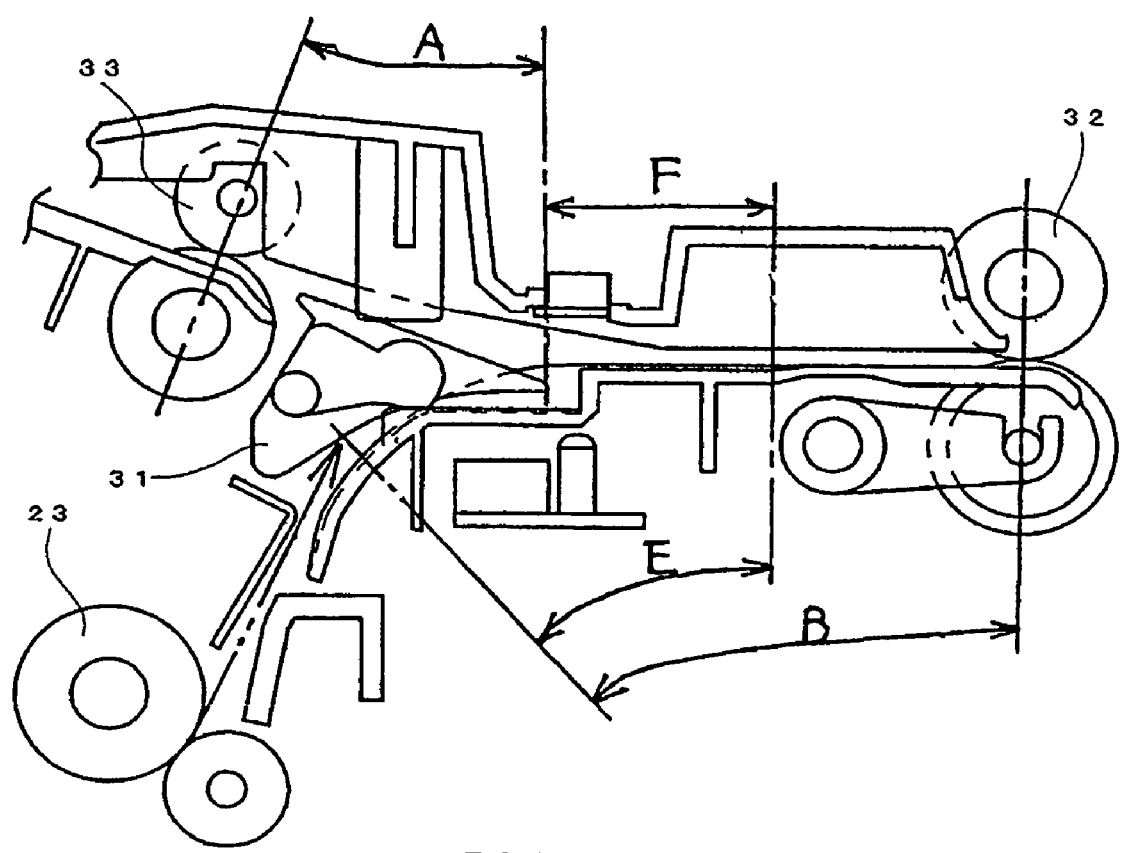
FIG. 11 is a sectional view to show the construction of an Auto Document Feeder in accordance with embodiment.
Figure 12:
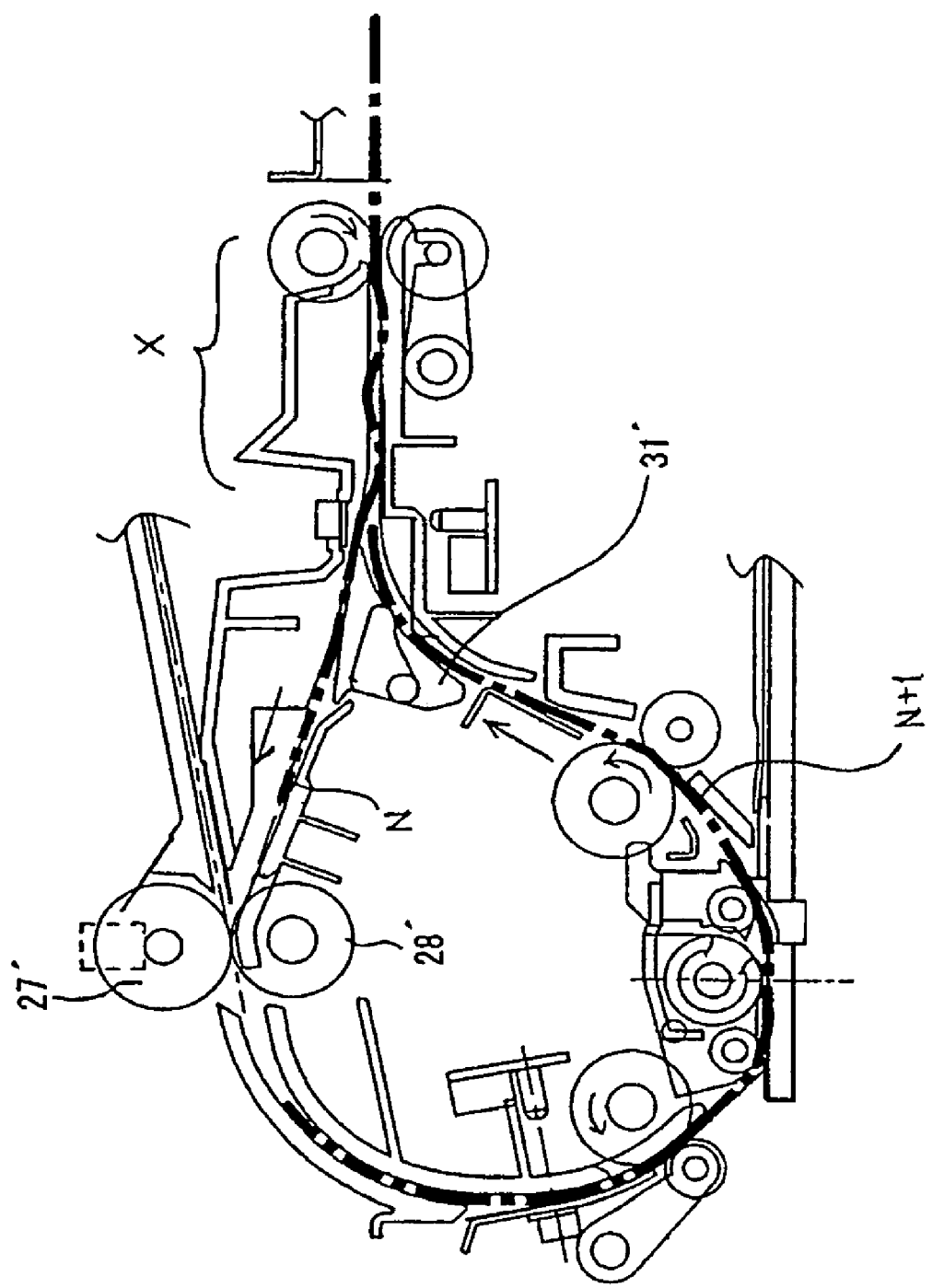
FIG. 12 is a sectional view to show the construction of an Auto Document Feeder of the related art.
Figure 13:
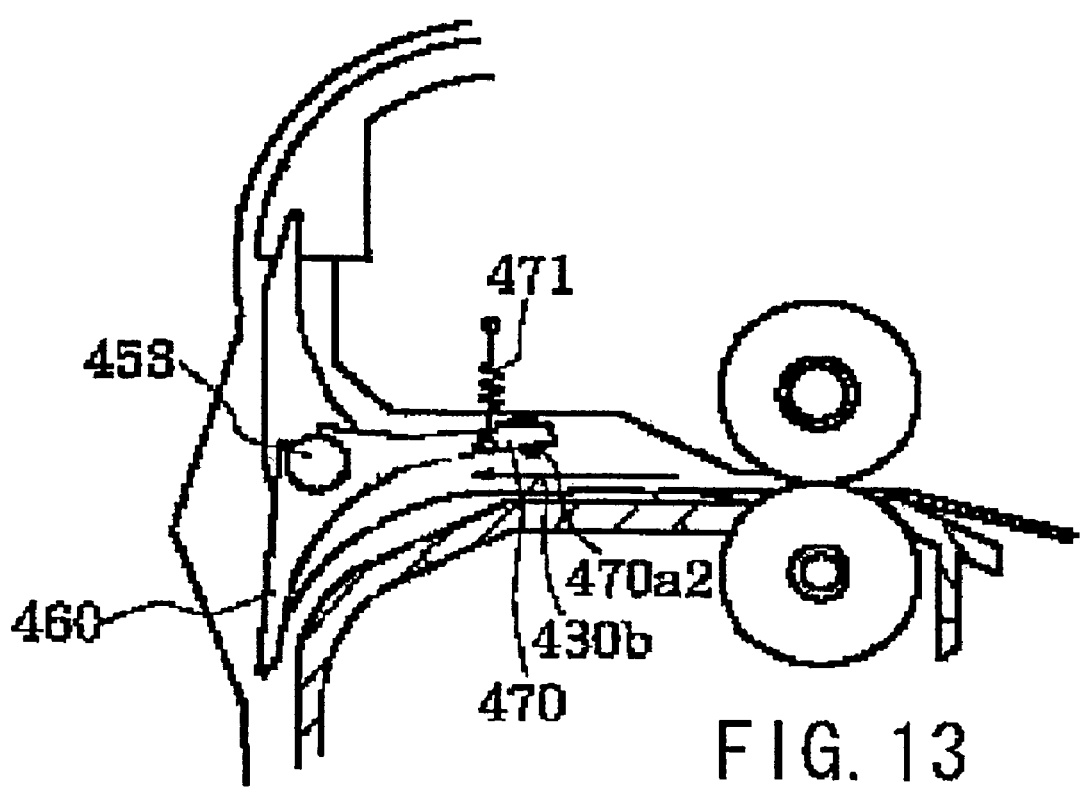
FIG. 13 is a sectional view to show the construction of an Auto Document Feeder of the related art.

As shown in FIG. 11, assuming that the distance between the entry position of the flapper 31 (upstream end of the flapper 31) and the position of the sheet discharging and reversing roller 32 in the first path 501 is B and that the time during which the sheet discharging and reversing roller 18 is separated from the sheet discharging and reversing roller 32 is C and that the document feed speed of the sheet discharging and reversing roller 32 and the read discharge roller 23 is Ps, the distance A between the entry position of the flapper 31 and the intermediate roller 33 in the second path 502 is set by the following equation (1).

$$A \leq B - (Ps \times C) \qquad \text{Equation (1)}$$

In this embodiment, B=47 mm, Ps=200 mm/sec, C=30 ms, and A=30 mm.

Further, assuming that the time during which the sheet discharging and reversing roller 32 stops when the document is reversed in the two-sided mode is D and that the distance between the entry position of the flapper 31 (upstream end of the flapper 31) and the position where the document is reversed in the second path 502 is F and that the distance between the entry position of the flapper 31 and the position where the document is reversed in the first path 501 is E, the interval between the rear end of the preceding document and the front end of the next document (sheet interval) L is set by the following equation.

$$L \geq E + (Ps \times D) + F \qquad \text{Equation (2)}$$

In this embodiment, it is set that L=75 mm, E=35 mm, D=100 ms, and F=20 mm. In this regard, the sheet interval is a sheet interval between the read discharge roller 23 and the sheet discharging and reversing part of the sheet discharging and reversing roller 32 as shown in FIG. 11. The position where the document is reversed is the rear end position of the document before switchback when the document is switched back by the sheet discharging and reversing roller 32 (corresponds to the front end position of the document after the switchback).

If the above equation (2) is satisfied, it is guaranteed that when the front end of the following document reaches the entry position (shown by arrow in FIG. 11) of the flapper 31 on the first path 501 side, the preceding document is switched back and the front end enters the tip of the flapper 31 on the second conveyance path. Further, if the equation (1) is satisfied, it is guaranteed that when the preceding document is at the tip position of the flapper 31 on the second path 502 side, the next document is positioned on the upstream side of the entry position of the flapper 31 on the first path 501 side and that the sheet discharging and reversing roller 18 is separated from the sheet discharging and reversing roller 32 when the preceding document enters the intermediate roller 34 to prevent the front end of the next document from interfering with the sheet discharging and reversing roller pair 32, 18.

That is, the preceding document is stopped at the sheet discharging and reversing part and is: conveyed to the second path 502 by the sheet discharging and reversing roller 32 and when the preceding document enters the entry part of the flapper 31, the next document enters the entry of the flapper 31 on the first path 501 side. Hence, this prevents the front end of the preceding document from lodging in the tip of the flapper 31.

After the preceding document enters the intermediate roller 33, the sheet discharging and reversing roller 32 does not need to convey the document. Hence, the sheet discharging and reversing roller 18 is separated from the sheet discharging and reversing roller 32 and then the next document enters the sheet discharging and reversing roller 32. In other words, the optimum arrangement of the intermediate roller 33 can hasten the entry of the next document to the sheet discharging and reversing roller 32. This can further improve the productivity in the high-speed two-side reading. The setting of the arrangement condition of the intermediate roller 33 (equation 1) and the sheet interval condition (equation 2) can reduce the size of the apparatus and stabilize the high-speed two-side reading.

[Description of Control Circuit Block]

Figure 4:
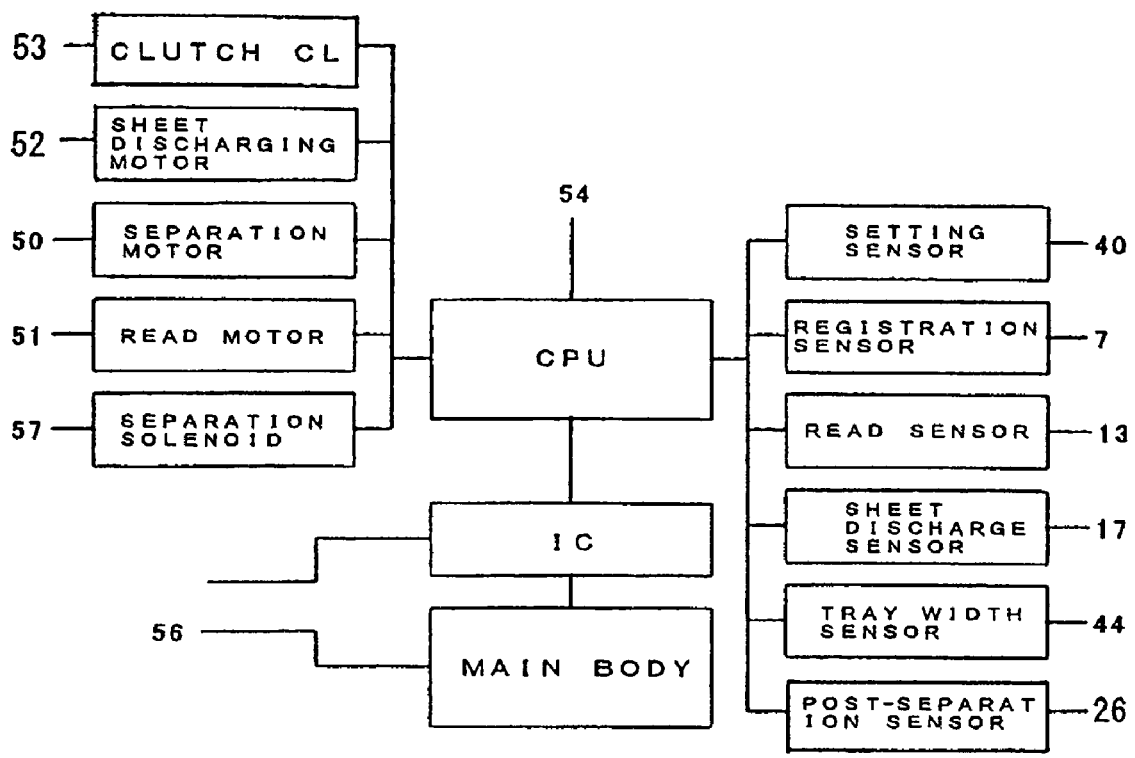
FIG. 4 is a control block diagram of an Auto Document Feeder in accordance with embodiment.

FIG. 4 is a block diagram to show the circuit construction of a control part of the ADF 2. The control circuit of the control part is constructed mainly of a microprocessor (CPU) 54 and the drive circuit of various kinds of loads and sensor signals are connected to the input/output port of the CPU 54.

Further, the control circuit is provided with a RAM backed up by a battery (not shown) and a ROM in which control sequence software is stored. Further, a reference numeral 55 is a communication IC for controlling data communication with the main body of a copying machine.

The separation motor 50 and the read motor 51 are driven by the respective stepping motor drivers. A phase exciting signal and a motor current control signal are inputted to the respective drivers from the CPU 54.

A separation solenoid 57 is driven by the driver and its operation is controlled by the signal connected to the input/output ports of the CPU 54.

The various kind of sensors such as the post-separation sensor 26, the registration sensor 7, the setting sensor 40, the read sensor 13, the sheet discharge sensor 17, the tray width sensor 44 are connected to the input/output ports of the CPU 54 and are used for monitoring the behavior of the document and the behavior of the moving load in the apparatus.

In the above embodiment, the embodiment has been described as an example in which the flapper 31 is applied a force to the first path 501 side (to the first abutting part 37a side) by the urging spring 31a. However, it is also recommended that when the document is not conveyed, the flapper 31 is positioned on the first path 501 side by the self weight of the flapper 31 without providing the urging spring.

In the above embodiment, the embodiment has been described in which the preceding document and the following document are set so as to pass each other before the preceding document enters the intermediate roller. However, it is also recommended that the preceding document and the following document are conveyed in such a way that they pass each other after the preceding document enters the intermediate roller.

In the above embodiment, the Auto Document Feeder for feeding the document on which the image is read has been described as a sheet conveying apparatus. However, the Auto Document Feeder is not limited to this apparatus but an apparatus for feeding sheets may be used. For example, the invention can be applied also to a sheet conveying apparatus for feeding a sheet on which an image is formed by an image forming part for forming an image on the sheet.

In this embodiment, the position of the driven flapper is limited and two sheets are passed in such a way that the two sheets pass each other in the two feed paths between which a predetermined path interval is secured and the driven flapper is interposed. With this, the sheets can be fed with stability and the apparatus can be reduced in size.

What is claimed is:

1. A sheet conveying apparatus comprising:
   a first path through which a sheet passes;
   a second path through which a sheet passes;
   a guide unit that can move, wherein the guide unit guides the sheet passing through the first path on one side of the guide unit and guides the sheet passing through the second path on an other side of the guide unit;
   a guide member which forms the second path with the other side of the guide unit, wherein one side of the sheet passing through the second path is guided by the guide member and the other side of the sheet passing through the second path is guided by the guide unit; and
   a limit member that limits moving of the guide unit,
   wherein when the guide unit is moved toward the guide member so that a sheet passes through the first path, the limit member limits the moving of the guide unit so as to form an interval, through which the sheet can pass between the guide member and the other side of the guide unit.

2. A sheet conveying apparatus according to claim 1, further comprising a switchback member that switches back the sheet passing through the first path and then conveys the sheet through the second path,
   wherein when a front end of the following sheet reaches an upstream end of the guide unit in the first path, a front end of the preceding sheet that is switched back and conveyed by the switchback member is positioned on a downstream side of the upstream end of the guide unit in the second path.

3. A sheet conveying apparatus according to claim 1, further comprising:
   a switchback member that switches back the sheet passing through the first path and conveys the sheet;
   a first conveyer roller that is provided in the first path and conveys the sheet;
   a roller member that is put into contact with or separated from the switchback member, wherein the roller member and the switchback member sandwich and convey the sheet; and
   a second conveyer roller that is provided in the second path and conveys the sheet,
   wherein when a front end of the preceding sheet is positioned at an upstream end of the guide unit in the second path, the following sheet is positioned on an upstream side of the upstream end of the guide unit in the first path, and
   wherein after the preceding sheet enters the second conveyer roller, the switchback member is separated from the roller member and after the switchback member is separated from the roller member, the following sheet conveyed by the first conveyer roller enters between the switchback member and the roller member.

4. A sheet conveying apparatus according to claim 1, further comprising:
   an urging member that applies a force to the guide unit to the first path side; and
   a second limit member that limits moving of the guide unit applied a force to the first path side by the urging member,
   wherein when the guide unit is moved toward the guide member against an urging force of the urging member by stiffness of the following sheet, the moving of the guide unit is limited by the limit member.

5. A sheet conveying apparatus according to claim 1, further comprising a switchback member that switches back the sheet passing through the first path and conveys the sheet;
   a first conveyer roller that is provided in the first path and conveys the sheet;
   wherein the preceding sheet conveyed by the switchback member so as to pass through the second path and the following sheet conveyed by the first conveyer roller toward the switchback member so as to pass through the first path are conveyed in such a way that they pass each other between the guide unit and the switchback member.

6. A sheet conveying apparatus according to claim 5, further comprising a second conveyer roller that is provided on a downstream side of the guide unit in the second path and conveys the sheet; and
   a control part that controls the driving of the switchback member and the first conveyer roller provided in the first path,
   wherein the control part controls the switchback member and the first conveyer roller in such a way that the preceding sheet and the following sheet conveyed by the first conveyer roller pass each other before the preceding sheet conveyed by the switchback member enters the second conveyer roller.

7. A sheet conveying apparatus according to claim 1, further comprising:
   a switchback member that switches back the sheet passing through the first path and conveys the sheet;
   a first conveyer roller that is provided in the first path and conveys the sheet;
   a roller member that can be put into contact with or separated from the switchback member, wherein the roller member and the switchback member sandwich and convey the sheet; and
   a second conveyer roller that is provided in a downstream side of the guide unit in the second path and conveys the sheet,
   wherein when it is assumed that a distance between an upstream end of the guide unit and a position of the switchback member in the first path is B and that time during which the switchback member is separated from the roller member is C and that a sheet conveying speed is Ps, the second conveyer roller is provided at a position where a distance A between an upstream end of the guide unit on the second path side and the second conveyer roller in the second path satisfies the following equation:

$A \leq B - (Ps \times C)$.

8. A sheet conveying apparatus according to claim 7, wherein the switchback member is a rotating body that rotates forward and backward and rotates forward to convey a sheet conveyed by the first conveyer roller and then rotates backward to switch back the sheet and then conveys the sheet, and
   wherein when it is assumed that time during which the switchback member stops when the switchback member switches between forward rotation and backward rotation is D and that a distance between the upstream end of the guide unit and a position where the sheet is reversed in the second path side is F and that a distance between the upstream end of the guide unit and the position where the sheet is reversed in the first path side is E, an interval L between a rear end of the preceding sheet and a front end of the following sheet is set in such a way as to satisfy the following equation:

$L \geq E + (Ps \times D) + F$.

9. An image reading apparatus comprising:
a reading part that reads an image on a sheet;
a first path through which the sheet having the image read by the reading part passes;
a second path through which the sheet having the image read by the reading part passes
a guide unit that can move, wherein the guide unit guides the sheet passing through the first path on one side of the guide unit and guides the sheet passing through the second path on the an other side of the guide unit;
a guide member which forms the second path with the other side of the guide unit, wherein one side of the sheet passing through the second path is guided by the guide member and the other side of the sheet passing through the second path is guided by the guide unit; and
a limit member that limits moving of the guide unit,
wherein when the guide unit is moving toward the guide member so that a sheet passes through the first path, the limit member limits the moving of the guide unit so as to form an interval, through which the sheet can pass between the guide member and the other side of the guide unit.

10. A sheet conveying apparatus according to claim 1, wherein the guide unit has an abutting part that abuts against the limit member when the guide unit moves toward the guide member and is provided outside a sheet passage area in which the sheet is passed.

11. A sheet conveying apparatus according to claim 1, wherein a following sheet being guided by the one side of the guide unit and a preceding sheet being guided by the other side of the guide unit pass each other.

12. An image reading apparatus according to claim 1, wherein a following sheet guided by the one side of the guide unit while the image is being read by the reading part and a preceding sheet guided by the other side of the guide unit pass each other.

\* \* \* \* \*

UNITED STATES PATENT AND TRADEMARK OFFICE
CERTIFICATE OF CORRECTION

| | |
|---|---|
| PATENT NO. | : 7,410,163 B2 |
| APPLICATION NO. | : 11/029571 |
| DATED | : August 12, 2008 |
| INVENTOR(S) | : Yamanaka |

It is certified that error appears in the above-identified patent and that said Letters Patent is hereby corrected as shown below:

COLUMN 1:
Line 17, "a original" should read --an original--.
Line 29, "is adopted" should read --there is adopted--.

COLUMN 2:
Line 16, "conveyance-path" should read --conveyance path--.

COLUMN 3:
Line 13, "sheet" (second occurrence) should read --sheet is--.

COLUMN 6:
Line 4, "slide" should read --slid--.
Line 15, "with pulled back upward not to" should read --pulled back and so as not to--.

COLUMN 9:
Line 18, "the tip" should read --the tips--.

COLUMN 11:
Line 36, "ms," should read --mm,--.
Line 61, "is: conveyed" should read --is conveyed--.

COLUMN 12:
Line 34, "various kind" should read --various kinds--.

COLUMN 15:
Line 6, "passes" should read --passes;--.
Line 10, "on the" should read --on--.

UNITED STATES PATENT AND TRADEMARK OFFICE
CERTIFICATE OF CORRECTION

PATENT NO. : 7,410,163 B2
APPLICATION NO. : 11/029571
DATED : August 12, 2008
INVENTOR(S) : Yamanaka It is certified that error appears in the above-identified patent and that said Letters Patent is hereby corrected as shown below:

<u>COLUMN 16</u>:
Line 13, "An image reading apparatus" should read --A sheet conveying apparatus--.

Signed and Sealed this

Sixth Day of January, 2009

JON W. DUDAS
*Director of the United States Patent and Trademark Office*